S. A. NEIDICH.
BICOLORED TYPEWRITER RIBBON AND PROCESS OF MAKING THE SAME.
APPLICATION FILED JULY 9, 1919.
1,364,788.                                          Patented Jan. 4, 1921.
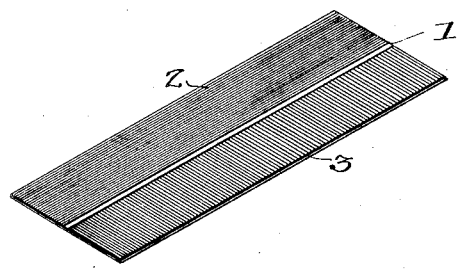
Inventor,
Samuel A. Neidich,
By his Attorneys,
Howson & Howson.

UNITED STATES PATENT OFFICE.

SAMUEL A. NEIDICH, OF BURLINGTON, NEW JERSEY.

BICOLORED TYPEWRITER-RIBBON AND PROCESS OF MAKING THE SAME.

1,364,788.　　　　　Specification of Letters Patent.　　Patented Jan. 4, 1921.

Application filed July 9, 1919. Serial No. 309,626.

*To all whom it may concern:*

Be it known that I, SAMUEL A. NEIDICH, a citizen of the United States, residing in Burlington, New Jersey, have invented a Bicolored Typewriter-Ribbon and Process of Making the Same, of which the following is a specification.

This invention relates to typewriter ribbon or similar tape used for recording purposes, and relates more particularly to the manufacture of bi-colored ribbons, the object of my invention being to provide an intense bi-colored ribbon in which the interfusion or running together of the colors is eliminated.

The inks of single color typewriter ribbons usually contain, in addition to a non-drying oil and a pigment, a solution of anilin base color in oleic or other fatty acid, such inks yielding a very considerably larger number of satisfactory impressions on the typewriting machine than similar inks which depend on the insoluble pigment color for their coloring matter. If inks containing pigment color only are applied to a fabric, the oil of the ink only is carried by capillarity, assisted by osmosis, and there is no tendency in making a bi-colored ribbon for the inks as a whole to interfuse with a consequent complete or partial destruction of the brighter color by the darker, but when, in order to secure greater density, intensity and durability, such inks are strengthened by the addition of fatty acid solutions of anilin color bases, there is a prompt and rapid transfer of a portion of the highly dyed oil from each side to the other, resulting in the complete or partial destruction of the brighter color by the darker, especially at or near the original line of demarcation between the colors.

For example, a blue ink will be made of some non-drying oil, such as castor or peanut, or a mixture of several non-drying oils, into which so called iron blue (Prussian, Milori, or similar colors) is ground until the color is in the finest possible degree of subdivision, and to this may be added an oleic acid solution of Victoria blue base. It is understood that the iron blue exists in the ink simply in suspension, whereas the oleate of the Victoria blue base is in solution and has the effect of highly dyeing the oil itself in which the pigment color is suspended. When an ink of this nature is applied side by side to the same piece of fabric with, for example, a similar red ink, as in the manufacture of bicolor, or so called bichrome typewriter ribbons, interfusion takes place and the dark blue ink soon spreads over and discolors the brighter red portion of the fabric in the manner already described. To provide means for eliminating this tendency of interfusion of the colors in bi-colored typewriter ribbon constitutes the object of this invention.

It is well-known that alkalis have the effect of saponifying the fatty acids, and it has further been found that when an alkali such as carbonate of soda or caustic soda is brought into contact with inks such as those described containing a fatty acid solution of anilin or similar coloring matter, there results a neutralization of the acidity, with the saponification of the fatty acid and conversion of the coloring matter back to its base or solid form, in which form it is not carried by capillarity across the color line. I propose to utilize the principle of this reaction in providing a bi-colored typewriter ribbon in which interfusion of the colors is eliminated, and this I have accomplished by first impregnating a narrow strip of the fabric extending along the longitudinal center of the ribbon with an alkaline solution, and then applying the two different colored inks to the ribbon, upon opposite sides of the central alkaline line. When the inks come in contact with the alkaline impregnated strip of the ribbon, the alkali neutralizes the acidity and saponifies the oleic acid, while the dye is converted back to its base in which form it is unable further to penetrate the fabric. A bi-color ribbon made in accordance with my invention is illustrated in the attached drawing, which shows in perspective a detached portion of the ribbon, the alkaline line being indicated by the reference numeral, 1, while 2 and 3 indicate the two different colored sides of the ribbon.

As a specific example of my process, in making a bi-colored ribbon comprising black and red inks, I may employ as my black ink, in addition to a non-drying oil in which lamp black is finely suspended, an oleic acid solution of nigrosine base, and for my red ink a similar solution of magenta base, added to a red pigment suspended in non-drying oil, and as a proper separating medium for inks having these constitutents I may employ an alkali. The separating line, 1, 1 may form by printing the same with an aqueous or alcoholic solution of carbonate of soda or caustic alkali, after which the red and black inks may be applied to the ribbon in the usual manner at opposite sides of the alkali line.

I do not wish to be limited to the use of any specific ingredients, however, either of the inks or of the ink separating medium, and I consider the invention as extending to the use with typewriter or similar ribbon employing differing inks or any of the constituents of an interfusible nature of any substance separating said inks which is chemically impregnable thereto or which, in other words, will react chemically with said inks to prevent interfusion or running together thereof. And although certain specific substances and groups of substances have been named herein as illustrating the essential features of my invention, it is to be understood that such named substances are not exhaustive of the field of substances capable of being used in accordance with my invention. And I desire it further understood that by the term "typewriter ribbon" employed in the claims I do not limit myself to ink bearing ribbon employed in typewriters alone, but desire such expression to cover any ink carrying ribbon which may be employed in any apparatus in a manner analogous to that of the ink carrying ribbon in typewriters.

I claim.

1. The process of making typewriter ribbon employing a plurality of differing inks, which consists of impregnating a strip of ribbon intermediate the edges thereof with a substance chemically impregnable to said inks, and applying said differing inks to the ribbon on opposite sides of said intermediate strip.

2. The process of making bi-colored typewriter ribbon employing inks of different color, which consists of impregnating a strip of the ribbon intermediate the edges thereof with a substance chemically impregnable to said inks, and applying said inks of different color to the ribbon on opposite sides of said intermediate strip.

3. The process of making bi-colored typewriter ribbon employing inks of different color comprising a non-drying oil, which consists of impregnating a strip of the ribbon intermediate the edges thereof with a substance capable of saponifying said non-drying oil, and applying said inks of different color to the ribbon on opposite sides of said intermediate strip.

4. The process of making bi-colored typewriter ribbon employing inks of different color comprising a non-drying oil and coloring matter soluble therein, which consists of impregnating a strip of the ribbon intermediate the edges thereof with a substance capable of throwing the coloring matter out of solution, and applying said inks of different color to the ribbon on opposite sides of said intermediate strip.

5. The process of making bi-colored typewriter ribbon employing inks of different color comprising a fatty acid, which consists of impregnating a strip of the ribbon intermediate the edges thereof with an alkali, and applying said inks of different color to the ribbon on opposite sides of said alkaline strip.

6. The process of making bi-colored typewriter ribbon employing inks of different color comprising a solution of coloring matter in a fatty acid, which consists of impregnating a strip of the ribbon intermediate the edges thereof with an alkali, and applying said inks of different color to the ribbon on opposite sides of said alkaline strip.

7. The process of making bi-colored typewriter ribbon comprising impregnating a strip of the ribbon intermediate the edges thereof with an alkali, and applying the oleic acid solutions of suitable coloring matter to the ribbon on opposite sides of said alkaline strip.

8. The process of making bi-colored typewriter ribbon comprising impregnating a strip of the ribbon intermediate the edges thereof with an alkali, and applying oleic acid solutions of analin color bases to the ribbon on opposite sides of said alkaline strip.

9. The process of making bi-colored typewriter ribbon comprising imprinting a line upon the ribbon intermediate the edges thereof with a solution of caustic soda, and applying oleic acid solutions of analin coloring matter to the ribbon on opposite sides of said printed line.

10. A typewriter ribbon comprising portions inked with differing inks, and a portion intermediate said inked portions impregnated with a substance chemically impregnable to said inks.

11. A typewriter ribbon comprising inked portions of differing color and a portion intermediate said inked portions impregnated with a substance chemically impregnable to said inks.

12. A typewriter ribbon comprising portions inked with inks of differing color containing a non-drying oil, said inked portions of differing color separated by a portion impregnated with a substance capable of saponifying said oil.

13. A typewriter ribbon comprising portions inked with inks of differing color containing a fatty acid, and an alkali impregnated portion separating said inked portions.

14. A typewriter ribbon comprising portions inked with inks of different color containing oleic acid solutions of suitable coloring matter, and an alkali impregnated portion separating said inked portions.

SAMUEL A. NEIDICH.